United States Patent [19] [11] 4,244,492
Beyerstedt et al. [45] Jan. 13, 1981

[54] PACKAGING FOR RECLAIMING SCRAP METAL

[75] Inventors: Ronald J. Beyerstedt, Waupaca, Wis.; Ludwig Gutnajer, Carversville, Pa.; Michael W. Laszewski, Appleton, Wis.

[73] Assignee: Champion International Corporation, Stamford, Conn.

[21] Appl. No.: 884,750

[22] Filed: Mar. 9, 1978

Related U.S. Application Data

[63] Continuation-in-part of Ser. No. 731,884, Oct. 13, 1976, abandoned.

[51] Int. Cl.³ .................. B65D 5/56; C22B 1/248
[52] U.S. Cl. .................. 220/453; 75/44 S; 220/441; 220/450; 220/454; 229/3.5 MF; 229/23 R; 428/576; 428/921
[58] Field of Search ............... 220/416, 417, 418, 441, 220/443, 450, 453, 455, 454; 229/23 R, 23 BT, 3.1, 3.5 R, 3.5 MF; 428/920, 921, 449, 453, 576; 75/44 R, 44 S, 48, 43, 65 R, 93 G, 256, 65

[56] References Cited

U.S. PATENT DOCUMENTS

| | | | |
|---|---|---|---|
| 132,743 | 11/1872 | Whitney | 75/44 R |
| 491,035 | 1/1893 | Allderdice | 75/48 |
| 1,136,370 | 4/1915 | Scharwath | 428/453 X |
| 1,147,996 | 7/1915 | Wrede | 428/453 |
| 1,462,835 | 7/1923 | Stericker | 428/449 |
| 1,809,953 | 6/1931 | Witte | 220/441 X |
| 1,961,365 | 6/1934 | Jones et al. | 428/449 |
| 2,656,089 | 10/1953 | Fallert et al. | 229/23 R |
| 2,658,662 | 11/1953 | Paulsen | 229/3.1 X |
| 2,821,514 | 1/1958 | Sarbach et al. | 428/920 X |
| 2,954,913 | 10/1960 | Rossman | 220/441 |
| 3,066,847 | 12/1962 | Fortune | 229/3.5 R |
| 3,640,837 | 2/1972 | Gaeth et al. | 428/428 X |
| 3,910,482 | 10/1975 | Bamburg et al. | 220/441 |

FOREIGN PATENT DOCUMENTS 554227 2/1957 Belgium ...................... 75/48

Primary Examiner—Allan N. Shoap
Attorney, Agent, or Firm—Evelyn M. Sommer

[57] ABSTRACT

Metallic scrap such as is recovered from metal turnings, borings and punchings is packed into a laminated fiber board container which is sealed and then introduced into an operating metal-melting furnace. The fiber board container resists combustion long enough to permit the scrap particles to reach the melt zone preventing entrainment of the scrap in the hot gas blast. This greatly reduces the loss of scrap particles from the furnace and aids in atmospheric pollution control.

12 Claims, 7 Drawing Figures

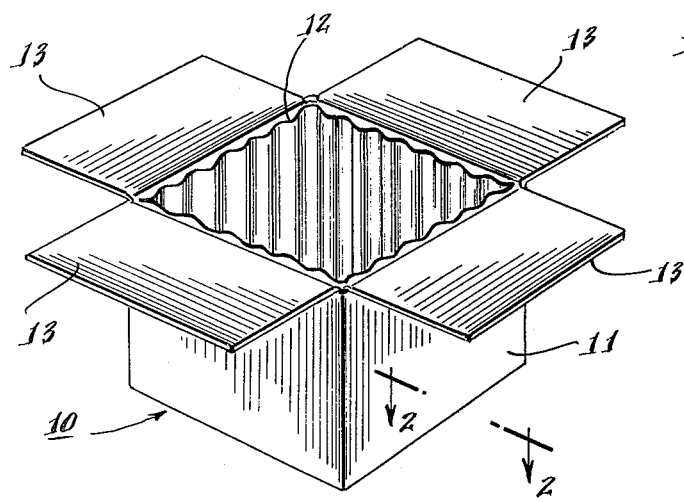
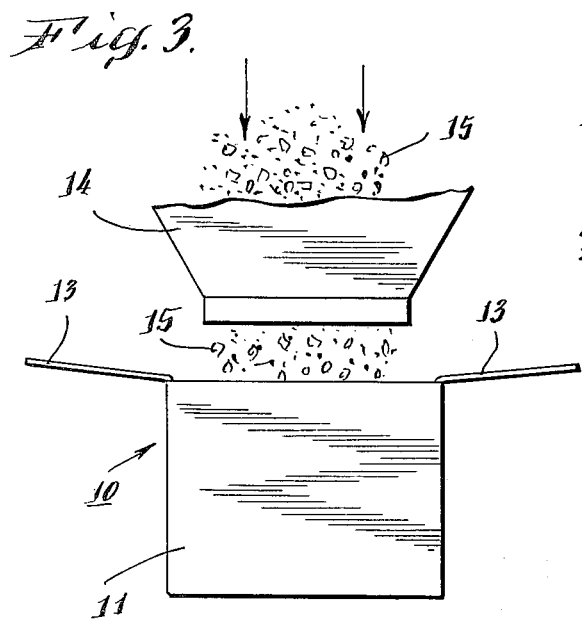
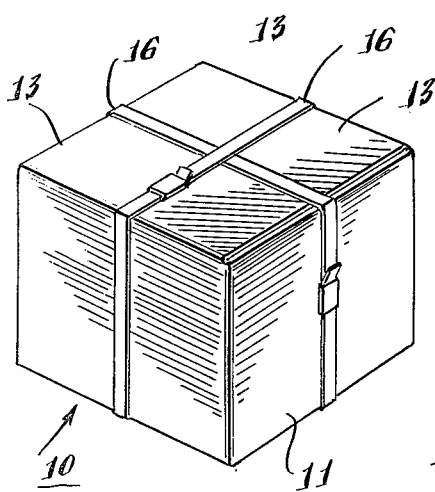
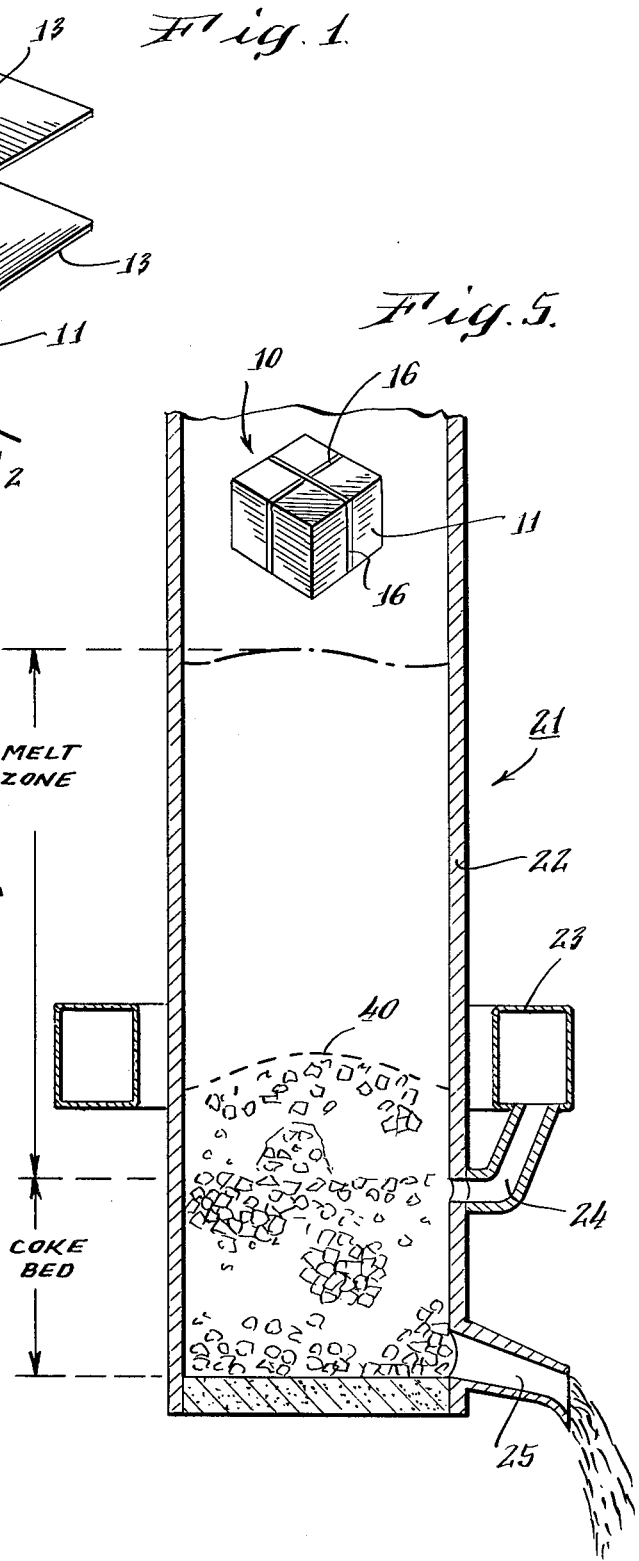

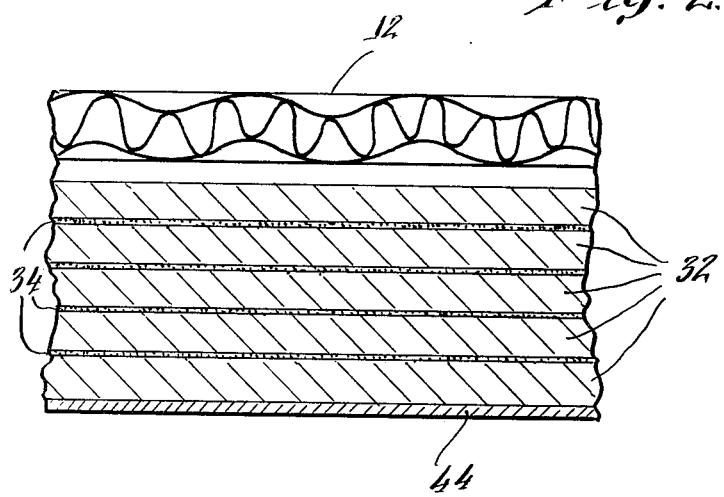
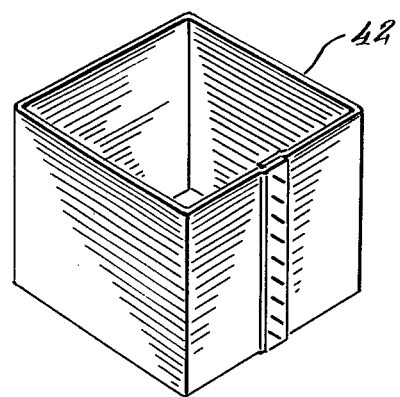
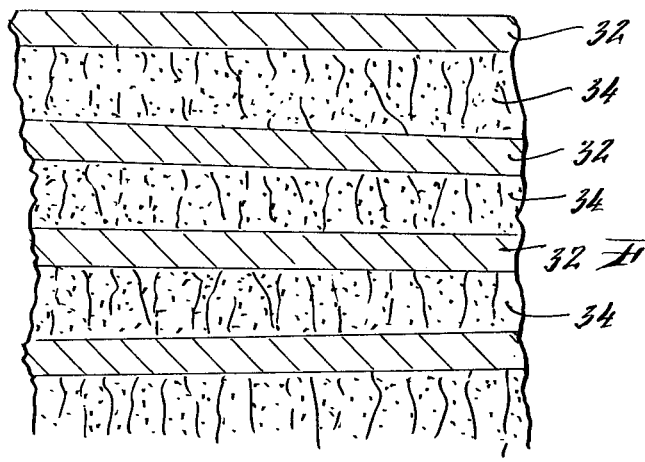

PACKAGING FOR RECLAIMING SCRAP METAL

CROSS-REFERENCE TO RELATED APPLICATION

This is a continuation-in-part of application Ser. No. 731,884 filed on Oct. 13, 1976, now abandoned.

BACKGROUND OF THE INVENTION

Significant amounts of ferrous and non-ferrous metal scrap are produced in manufacturing plants with a variety of machining operations. Scrap produced in such plants can include small, non-uniform fragments and sometimes powder. Such scrap is suitable for remelting in a furnace such as a cupola furnace, but since some of the particles of scrap introduced into such a furnace are in finely divided form, the hot gases rushing through the furnace may entrain such particles and carry them to the atmosphere. Thus, particles may not only be lost to the melt, but may contribute to atmospheric pollution.

For over a century, it has been recognized that a solution to the scrap reuse problem lay in introducing the scrap particles to the furnace in a form which would permit the particles to sink into the melt rather than to be entrained in the rising gases. Thus, U.S. Pat. No. Re. 2,250, dated May 22, 1866, describes and claims a process whereby scrap particles are mixed with earth, clay or similar material to which is added water or sulphuric acid in order to aggregate the scrap to pieces large enough to fall into the melt upon being introduced to an operating furnace. U.S. Pat. No. 132,743, dated Nov. 5, 1872, describes the packing of scrap material into wooden boxes, instead of the then used cast iron vessels, and charging the boxes to a furnace. U.S. Pat. No. 3,864,092 which issued Feb. 4, 1975, discloses forming scrap metal particles with a binder into blocks having openings therethrough and the introduction of such blocks to a furnace.

Consideration has also been given to wrapping the scrap in conventional cardboard or paper materials. However, such materials burn quickly in the intense heat of a furnace and thus release the scrap in a region wherein it may become entrained in the gas flow.

While aggregation or agglomeration of the scrap particles with a non-metallic material or enclosure of the particles within a strong container both offer a solution to the scrap loss problem, they provide a relatively expensive solution. The present invention is aimed at enclosing the scrap particles in a relatively weak container which minimizes losses as effectively as the strong container, yet simplifies and reduces the handling costs of containerization.

SUMMARY OF THE INVENTION

The present invention is directed to a laminated fiber board container into which finely divided scrap particles may be packed. The individual lamina are bonded by a laminating agent comprising a layer of intumescent adhesive. When such a container is introduced to an operating furnace, the intumescent action of the adhesive retards burning long enough for the scrap particles to reach a melt zone in which they are not likely to be entrained in furnace gases.

BRIEF DESCRIPTION OF THE DRAWING

While the specification concludes with claims particularly pointing out and distinctly claiming that which is regarded as the present invention, details of preferred embodiments of the invention may be more readily ascertained from the following description when read in conjunction with the accompanying drawings wherein:

FIG. 1 is a perspective view of a fiber board container made in accordance with this invention and including one embodiment of a suitable liner;

FIG. 2 is a broken sectional view of the container of FIG. 1, taken along the lines 2—2 of FIG. 1;

FIG. 3 is a broken view of a hopper chute feeding scrap particles to a container of the type illustrated in FIG. 1;

FIG. 4 is a perspective view of a packed and sealed container reinforced with steel strapping;

FIG. 5 is a schematic sectional view of a cupola furnace illustrating the introduction of a container into the furnace;

FIG. 6 is a perspective view of another embodiment of a suitable liner; and

FIG. 7 is a sectional view of part of a wall of the container after introduction into the furnace but before combustion.

DETAILED DESCRIPTION OF THE INVENTION

With reference to FIGS. 1 and 2, a container 10 made in accordance with the present invention, is made of a laminated fiber board material folded from a box blank which may be side-stitched with conventional metal staples (not shown). The sheet 11 will preferably have about five lamina 32 of 0.020-inch thickness Kraft linerboard, which has a density of approximately 69 lbs. per thousand square feet. The lamina are bonded by a laminating agent consisting of thin layers 34 of an intumescent adhesive.

An intumescent material is a material which bubbles up or swells under specific conditions such as exposure to heat.

It has been discovered that water soluble silicate adhesives have intumescent properties and expand to form a burn-retarding siliceous or glassy foam when subjected to temperatures exceeding the decomposition temperature of the silicate hydrate. Thus, a highly combustion-resistant container can be made by using such adhesives as the laminating agent between layers of fiber board.

Water soluble silicate adhesives which are known to be suitable for use in the present invention include alkali metal silicates, such as sodium or potassium silicates. The silicates may be mixed with diluents such as graphite or clay and soda ash for use in laminating fiber board. Such adhesives are commercially available from various sources. One particular adhesive, which has a viscosity preferred for manufacturing purposes, is called a K silicate by its manufacturer, the Philadelphia Quartz Co. of Valley Forge, Pa. This silicate has a silica/sodium oxide ratio of 2.88, but other silicates having different silicate/sodium oxide ratios have also been found to work.

A liner 12 which may be composed of fiberboard or cardboard material, in one embodiment can be placed inside the container 10. The liner 12 increases the strength of the container 10 to reduce the chance of a rupture when the container is introduced into the furnace. While the corrugated liner 12 is shown separated from the fiberboard for purposes of clarity, the outside dimensions of the liner are preferably approximately equal to the inside dimensions of the container to assure a movement-free fit. The liner may or may not be glued into place. The liner 12 may have an interior flat layer (not shown) of paper sheet glued thereto to provide further strength.

FIG. 6 shows another preferred embodiment of a liner 42 for container 10. In this embodiment, the liner material is the same or substantially the same as the laminated fiberboard material used for the container 10. That is, several fiber board layers are laminated by layers of intumescent adhesives. The outside dimensions of liner 42 are approximately equal to the inside dimensions of the container into which the liner is to be inserted.

The containers and liners may be manufactured at a remote location and shipped flat to the point of use. This is a great advantage to the furnace operators since carton manufacturers can use conventional equipment and materials to provide cartons having the necessary laminar construction and can ship them to the point of use in flat and compact form. The containers can be stored flat at the point of use but be quickly made ready for use by folding a series of closing flaps 13.

As shown in FIG. 3, a container 10 folded for use is positioned under a hopper feed 14 which introduces scrap particles 15 to the carton 10. After the required quantity of particles 15 have been packed into the carton 10, the flaps 13 are closed and preferably sealed. The carton may then be introduced to a furnace. However, before introduction to a furnace, the carton may be provided with reinforcement strapping as illustrated at 16 in FIG. 4. A standard strapping machine may be used for this purpose. Such strapping provides additional strength and may be quickly and cheaply applied. Accordingly, it represents a preferred form of practicing this invention.

FIG. 5 illustrates the application of this invention for use in a conventional cupola furnace 21. The furnace 21 comprises a steel shell 22, a rim box 23, a tuyere 24 for introducing air under pressure to the coke bed, and a tap 25 for removing molten products. The coke bed and melt zone of the furnace 21 are indicated by legends and dashed lines to the left of furnace 21. A first container 10 packed with scrap particles 15 is shown at the top of the furnace 21 falling toward the melt zone. While the container 10 is subject to extreme heat, it is expected to remain intact long enough to allow the scrap particles to reach the melt zone, at which point the particles are not likely to be entrained in gases rising from the tuyere 24. The contents of an earlier-introduced carton are shown as a mound 40 at the base of the melt zone. The scrap particles remaining in this region will quickly become molten.

When the container 10 actually is introduced into the furnace, the fiber board lamina begin to char while, as is illustrated in FIG. 7 the silicate adhesive layers 34 begin to swell, creating multiple, thick layers of glassy foam which retard combustion of the inner fiber board lamina. By the time the innermost fiber board layers do burn, the scrap should have reached the melt zone.

Referring again to FIG. 2, the container material 11 may in one embodiment include a highly reflective surface 44 which could be approximately 0.018 to 0.020 inch of what is generically referred to as "clay-coated news" or "Kraft backed paper". This material is conventional in its make-up and is of the same family of materials as are used for consumer packages such as cake-mix boxes or cereal cartons. There are different combinations which may be used to obtain this type of sheet. A common method is to take a 0.015-inch news or Kraftboard and laminate to that a 0.005-inch bleached sheet which is subsequently coated with an emulsion or mixture of white Georgia kaolin clay and titanium dioxide to improve whiteness and reflectivity, suspended in a matrix which is air dryable.

The coating is applied as the fiber board sheet is brought across a roller which is running in a trough containing the water laden coating mixture and which brings the mixture up into contact with the paper as it crosses the roller. The tension of the paper against the roller squeezes the excess coating material down the upwardly rotating side of the roller and the wetted sheet is then passed in front of an air knife arrangement which serves to remove the remaining excess from the rollers. The paper may then be directed around a large roll during which it is air-dried. It is then passed through a conventional series of dryer rolls to dry the matrix more completely.

The above-described method of obtaining a highly reflecting surface on the carton is advantageous in that it uses existing equipment and is economical in the use of materials. However, other methods such as spray coating may also be used. For example, aluminum powder suspended in a vehicle may be sprayed on the outer surface of layer 11 to provide a highly reflecting surface. Aluminum foil may be used as the reflecting surface.

Flame tests were conducted on 10 inch by 10 inch laminated fiber board specimens. In these tests a two-pound metal weight was placed on top of the center of each specimen. A 1650° F. (899° C.) flame impinged on the bottom center of the specimen for 10 minutes or until the weight dropped through the specimens, whichever occurred sooner.

The examples of Table I give results of the flame test using various compositions as indicated for the laminating agent. In some of the examples, the surface facing the flame was coated with a highly reflective refractory composition as indicated.

The graphite used, designated as "230V", is a chemically refined material containing 99% carbon in the form of Madagascar flake graphite, 99% of which would pass through a 325 mesh screen. The supplier is Asbury Graphite Mills, Inc. A binder designated as "O" and obtained from the Philadelphia Quartz Co. is composed of 9.15% $Na_2O$ and 25.5% $Si\ O_2$ with water added to provide a viscosity of 400 centipoise. A "refractory mix" supplied by Chicago Fire Brick Co. consists of approximately equal weight proportions of dry sodium silicate, silica flour, sode ash and Kaolin clay. While the precise compositions of Binder "O" and "refractory mix" are given above, satisfactory results could be achieved with widely differing ranges of compositions.

TABLE I

| Example | Composition of Material 32 | Composition of Surface Coat | Duration of Flame Test | Appearance at End of Test |
|---|---|---|---|---|
| 1 | Binder "O" | No surface coat | 10 minutes | No flame penetration. Surface carbonized. |

TABLE I-continued

| Example | Composition of Material 32 | Composition of Surface Coat | Duration of Flame Test | Appearance at End of Test |
|---|---|---|---|---|
| 2 | 288 grams "Refractory Mix" in 500 cc Binder O | No surface coat | 10 minutes | No flame penetration. Surface carbonized. |
| 3 | 288 grams "230V" Graphite in 800 cc Binder "O" | No surface coat | 9 minutes | Flame penetrated but did not spread. |
| 4 | Binder "O" | 250 grams "230V" Graphite in 250cc Binder "O" | 10 minutes | No flame penetration. Cracks in surface coat. |
| 5 | Binder "O" | 300 grams "Refractory Mix" in | 10 minutes | No flame penetration. Cracks in surface coat. Carbonized. |
| 6 | Binder "O" | Binder "O" | 6 minutes | Flame penetrated but did not spread. |
| 7 | Binder "O" | 482 grams "Refractory Mix" in 500cc Binder "O" | 8 minutes | Flame penetrated but did not spread. |

In the tests of Examples 1–7, it was deemed that any sample which did not suffer burn-through in ten minutes would make a satisfactory box material.

The tests did not conclusively demonstrate that a highly reflective surface coat conferred an improvement in flame resistance. In certain instances, a highly reflective surface appeared to be detrimental. In the absence of a surface refractory layer, the outer ply of Kraft paper carbonizes quickly. After carbonization, this layer apparently serves as effective thermal insulation. Of Examples 1–7, Example 1 was deemed to give the best results and this is the preferred embodiments of the invention insofar as Examples 1–7 are concerned.

While the cartons 10 and 10a are not restricted as to shape or size, an approximate cubic configuration is best for convenience of handling and resistance to damage. Accordingly, such a configuration represents a preferred form of practicing the invention. The typical size is a cubic foot, but larger or smaller cartons may be used satisfactory in practicing the invention.

What is claimed as new is:

1. A burn-retardant packaging means for introducing metal scrap into a metal-melting furnace while minimizing entrainment of the metal scrap in the furnace gases, said packaging means defining a container for enclosing metal scrap therein and comprising
   a bottom wall;
   a plurality of side walls joined to said bottom wall;
   a top wall comprising a plurality of closure flaps hingedly joined to said side walls;
   said bottom wall, said plurality of side walls, and said top wall defining a complete enclosure and being made from more than two laminae of fiberboard wherein the individual laminae are bonded to each other by substantially uniform and continuous layers of a laminating agent comprising an intumescent adhesive, said layers of laminating agent being substantially coextensive with the bonded surfaces of said laminae;
   said intumescent adhesive layers expanding in the presence of heat when said packaging means is placed in said furnace and forming layers of a burn-retarding foam between said individual laminae, thereby insulating the metal scrap in said container to prevent premature exposure of said metal scrap to the heat in said furnace.

2. A burn-retardant container as recited in claim 1 wherein the intumescent adhesive is a silicate adhesive.

3. A burn-retardant container as recited in claim 2 wherein the laminating agent includes a diluent.

4. A burn-retardant container as recited in claim 3 wherein the diluent is selected from the group consisting of clays, soda ash and graphite.

5. A burn-retardant container as recited in claim 2 wherein the silicate adhesive comprises a water soluble, alkali metal silicate adhesive.

6. A burn-retardant container as recited in claim 5 wherein the alkali metal is selected from the group consisting of sodium and potassium.

7. A burn-retardant container as recited in claim 5 in further combination with a laminated liner having outside dimensions approximately equal to the inside dimensions of said container, said liner being made of the same type of laminated fiber board as the container.

8. A burn-retardant container as recited in claim 5 further including a highly reflective surface layer.

9. A burn-retardant container as recited in claim 8 wherein the highly reflective surface layer comprises a mixture of white clay and titanium dioxide.

10. A burn-retardant container as recited in claim 1 in further combination with a laminated liner having outside dimensions approximately equal to the inside dimensions of said container, said liner being made of the same type of laminated fiber board as the container.

11. A burn-retardant container as recited in claim 1 further including a highly reflective surface layer.

12. A burn-retardant container as recited in claim 11 wherein the highly reflective surface layer comprises a mixture of white clay and titanium dioxide.

* * * * *

UNITED STATES PATENT AND TRADEMARK OFFICE
CERTIFICATE OF CORRECTION

PATENT NO. : 4,244,492

DATED : January 13, 1981

INVENTOR(S) : Ronald J. Beyerstedt, Ludwig Gutnajer, Michael W. Laszewski

It is certified that error appears in the above—identified patent and that said Letters Patent is hereby corrected as shown below:

In Column 5, Table I, Example 5, after "Mix" in", insert -- 250 cc Binder "O" --.

Signed and Sealed this

Eighteenth Day of August 1981

[SEAL]

Attest:

Attesting Officer

GERALD J. MOSSINGHOFF

Commissioner of Patents and Trademarks